(12) United States Patent
Stautzenberger et al.

(10) Patent No.: US 8,490,692 B2
(45) Date of Patent: *Jul. 23, 2013

(54) CONTINGENCY RELEASE DEVICE THAT USES RIGHT-HAND TORQUE TO ALLOW MOVEMENT OF A COLLET PROP

(75) Inventors: Arthur Stautzenberger, Carrollton, TX (US); Brock Watson, Sadler, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/596,597

(22) Filed: Aug. 28, 2012

(65) Prior Publication Data
US 2013/0108356 A1    May 2, 2013

Related U.S. Application Data

(63) Continuation of application No. 13/587,596, filed on Aug. 16, 2012, which is a continuation of application No. PCT/US2011/058694, filed on Nov. 1, 2011.

(51) Int. Cl.
*E21B 17/04* (2006.01)
*E21B 17/046* (2006.01)

(52) U.S. Cl.
USPC .................................................. 166/242.6

(58) Field of Classification Search
USPC ................. 166/381, 383, 377, 242.6
See application file for complete search history.

(56) References Cited

U.S. PATENT DOCUMENTS

| 5,363,921 | A | 11/1994 | Mendez | |
|---|---|---|---|---|
| 6,059,042 | A * | 5/2000 | Huber et al. | 166/377 |
| 7,096,952 | B2 * | 8/2006 | Harmon et al. | 166/301 |
| 7,100,696 | B2 * | 9/2006 | Marshall | 166/377 |
| 7,373,974 | B2 * | 5/2008 | Connell et al. | 166/242.6 |
| 7,931,085 | B2 * | 4/2011 | Moyes | 166/301 |
| 8,002,036 | B2 * | 8/2011 | Moyes | 166/301 |
| 8,069,916 | B2 * | 12/2011 | Giroux et al. | 166/212 |
| 2003/0217850 | A1 * | 11/2003 | Shaw et al. | 166/374 |
| 2006/0054322 | A1 | 3/2006 | Rose | |
| 2007/0034372 | A1 * | 2/2007 | Moyes | 166/250.1 |
| 2010/0270034 | A1 * | 10/2010 | Clausen | 166/383 |
| 2010/0319930 | A1 | 12/2010 | Evans | |
| 2012/0175132 | A1 * | 7/2012 | Watson et al. | 166/386 |

FOREIGN PATENT DOCUMENTS
WO    03029605 A1    4/2003

* cited by examiner

*Primary Examiner* — Nicole Coy
(74) *Attorney, Agent, or Firm* — Paul Herman; Sheri Higgins Law; Sheri Higgins

(57) ABSTRACT

A device comprises: a torsion lock sleeve, wherein the torsion lock sleeve comprises a crenellated second end, wherein the torsion lock sleeve is tubular in shape, and wherein at least a portion of the inner circumference of the torsion lock sleeve engages at least one ridge, wherein the ridge inhibits or prohibits rotational movement of the torsion lock sleeve; and a release nut, wherein the release nut comprises a crenellated first end, and wherein the first end of the release nut is capable of engaging the second end of the torsion lock sleeve.

19 Claims, 6 Drawing Sheets

CONTINGENCY RELEASE DEVICE THAT USES RIGHT-HAND TORQUE TO ALLOW MOVEMENT OF A COLLET PROP

CROSS-REFERENCE TO RELATED APPLICATION

This application is a continuation of and claims priority to U.S. application Ser. No. 13/587,596, filed on Aug. 16, 2012, which claims priority to PCT Application No. PCT/US11/58694, filed on Nov. 1, 2011.

TECHNICAL FIELD

A contingency release device and methods of use are provided. The device can be used to provide a sufficient amount of set down stroke to a collet prop necessary to allow compression of collet fingers on a tool. The device includes a release nut and a torsion lock sleeve that are capable of engaging each other via crenellated ends. According to certain embodiments, the release nut and torsion lock sleeve are disengaged via movement of a piston. According to other embodiments, after disengagement, the release nut is displaced by applying a right-hand torque to an inner release mandrel.

SUMMARY

According to an embodiment, a device comprises: a torsion lock sleeve, wherein the torsion lock sleeve comprises a crenellated second end, wherein the torsion lock sleeve is tubular in shape, and wherein at least a portion of the inner circumference of the torsion lock sleeve engages at least one ridge; and a release nut, wherein the release nut comprises a crenellated first end, and wherein the first end of the release nut is capable of engaging the second end of the torsion lock sleeve.

According to another embodiment, a method of displacing a release nut comprises: positioning a device in a portion of a subterranean formation, wherein the device comprises: a torsion lock sleeve, wherein the torsion lock sleeve comprises a crenellated second end, wherein the torsion lock sleeve is tubular in shape, and wherein at least a portion of the inner circumference of the torsion lock sleeve engages at least one ridge; and a release nut, wherein the release nut comprises a crenellated first end, and wherein the first end of the release nut is engaged with the second end of the torsion lock sleeve; moving the torsion lock sleeve, wherein the step of moving the torsion lock sleeve comprises disengaging the first end of the release nut with the second end of the torsion lock sleeve; and moving the release nut.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1A:
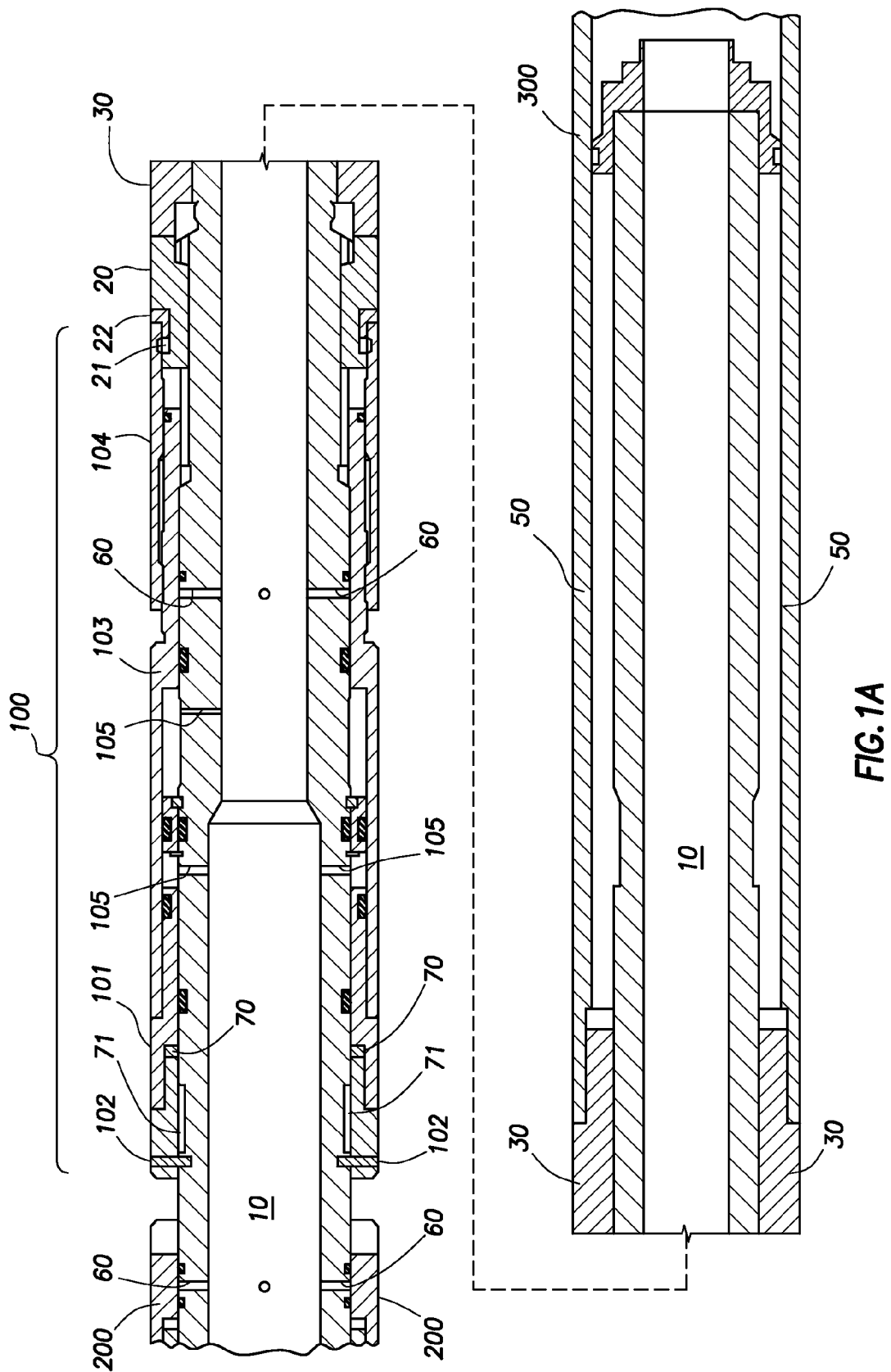
FIG. 1A is a diagram of the device, wherein a release nut is connected to an outer cylinder, shown prior to movement of the release nut and outer cylinder.

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more ends, ports, etc., as the case may be, and does not indicate any sequence. Furthermore, it is to be understood that the mere use of the term "first" does not require that there be any "second," and the mere use of the term "second" does not require that there be any "third," etc.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs).

In order to produce oil or gas, a wellbore is drilled into a reservoir or adjacent to a reservoir. A portion of a wellbore may be an open hole or cased hole. In a cased-hole wellbore portion, a casing is placed into the wellbore, which can also contain a tubing string. A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

After a wellbore has been drilled, the wellbore is then completed. During completion of an open-hole wellbore portion, a tubing string may be placed into the wellbore. The tubing string allows fluids to be introduced into, or flowed from, a remote portion of the wellbore. A tubing is a section of tubular pipe, usually 30 feet in length. Examples of pipes can include a blank pipe, a sand screen, or a washpipe. A tubing string refers to multiple sections of pipe connected to each other. A tubing string is created by joining multiple sections of pipe together via male right-handed threads at the bottom of a first section of pipe and corresponding female threads at the top of a second section of pipe. The two sections of pipe are connected to each other by applying a right-hand torque to the first section of pipe while the second section of pipe remains relatively stationary. The joined sections of pipe are then lowered into the wellbore. The process continues in this fashion until the desired length of tubing string has been placed in the wellbore.

There are several tools that are used in oil and gas operations that include a collet and a collet prop. A collet is generally fitted around the outside of a mandrel. The collet commonly includes at least one concentric ring and collet fingers that extend from the ring. The collet fingers can include a lug. A retrieving tool is one example of a tool that can include a collet. A retrieving tool can be used to retrieve an object, such as a downhole tool or tubular, from a wellbore and return the object to the surface. The object to be retrieved generally includes recesses that correspond to lugs on the collet fingers. The lugs on the collet fingers are designed to fit inside the recesses on the object. The collets are prone to contract around the outer diameter of the mandrel. In order to prevent the collet fingers from contracting, and thus, not engage with the recesses on the object, a collet prop can be positioned between the collet and the outside of the mandrel. Another example of a tool that can include a collet is an expansion tool. Prior to expansion, a tubing string, such as a liner, can be suspended from the collet via collet finger lugs that engage recesses in the tubing string. The collet fingers are rigid and can support the weight of the tubing string only when the collet prop is located under the collet.

These tools often include an outer cylinder and an inner mandrel. Typically, the outer cylinder and inner mandrel are prevented from moving relative to the tubing string, via a shouldered connection. Once the desired tool operation is completed, such as expansion of the tubing string, the shouldered connection is separated and there is free movement of the outer cylinder or inner mandrel with respect to the tubing string. Upon separation of the shouldered connection, the collet prop can be moved, also called dropped. Typically, this is accomplished by moving either the inner mandrel or the outer cylinder downward with respect to the tubing string. The movement of the outer cylinder or inner mandrel causes the collet prop to move out from underneath the collet. The collet prop must be dropped to a point below the collet in order for the fingers to flex inward towards the mandrel. When the collet fingers can be easily flexed inward, the tool can be released from the tubing string. The amount of movement of the collet prop required to release the tool can vary based on the tool design, but is generally in the range of about 4 inches (in.) to about 8 in.

However, in some situations, it may be necessary to release a tool prior to the completion of the desired tool operation. By way of example, for an expansion tool, if the tubing string becomes stuck in the wellbore before it reaches the desired depth, then the running tool must be released from the tubing string. As mentioned above, the collet prop can be dropped upon completion of the desired tool operation because the shoulder connection is separated. However, prior to the completion of the tool operation, the shouldered connection will not be separated and the ability to move the collet prop out from underneath the collet to release the tool is not possible. Therefore, contingency release devices have been developed that provide the required distance for the collet prop to drop to allow retraction of the collets and subsequent release of the tool. Typically, these contingency release mechanisms require additional steps or a specific sequence of additional steps to be performed in order to drop the collet prop. The steps or sequence of steps can be designed such that the risk of unintentionally activating the contingency release mechanism at the incorrect time is reduced.

Contingency release devices commonly include shear pins or a J-slot. A shear pin contingency release mechanism is a sliding connection that would allow the required movement of the collet prop once the shear pins are broken through a set down force. A minimum amount of weight is required to break the shear pins, which then allows the sliding connection to move downward and allows the collet prop to move out from underneath the collet. However, a disadvantage to using shear pins is that if the force required to break the pins is designed to be too low, then there is a risk of accidentally shearing the pins while pushing the tubing string into the wellbore. Moreover, if the force required to break the pins is designed to be too high, then there is a risk of exceeding the available force that can be applied to the mechanism, in which case the mechanism would not operate and the shear pins would never break. A J-slot contingency release mechanism requires a left-hand torque to be applied to the device followed by a set down weight in order to drop the collet prop. This device functions by moving some lugs in a "J" shaped slot via left-hand torque and set down weight. The J-slot groove is designed to prevent the risk of accidental operation of the contingency release mechanism while pushing the tubing string into the wellbore. However, because a tubing string is assembled by connecting multiple sections of pipe together via right-hand torque, field operators are hesitant to apply a left-hand torque for fear of unthreading sections of the tubing string.

Thus, it is desirable to provide an apparatus that provides the required distance for moving a collet prop out from underneath a collet prior to completion of the desired operation of the tool. It is desirable that the apparatus does not have force restrictions and does not require left-hand torque for movement.

A novel apparatus and method of use for moving a release nut are provided. The release nut can be engaged to a torsion lock sleeve via crenellated ends of the nut and sleeve. The torsion lock sleeve can be prevented from rotating about an inner mandrel via one or more ridges. In the event it becomes necessary to drop a collet prop, the release nut can be moved, which will allow movement of the collet prop. The release nut can be moved by disengaging the torsion lock sleeve from the release nut. The release nut can now be moved by applying a right-hand torque to the nut.

According to an embodiment, a device comprises: a torsion lock sleeve, wherein the torsion lock sleeve comprises a crenellated second end, wherein the torsion lock sleeve is tubular in shape, and wherein at least a portion of the inner circumference of the torsion lock sleeve engages at least one ridge; and a release nut, wherein the release nut comprises a crenellated first end, and wherein the first end of the release nut is capable of engaging the second end of the torsion lock sleeve.

According to another embodiment, a method of displacing a release nut comprises: positioning a device in a portion of a subterranean formation, wherein the device comprises: a torsion lock sleeve, wherein the torsion lock sleeve comprises a crenellated second end, wherein the torsion lock sleeve is tubular in shape, and wherein at least a portion of the inner circumference of the torsion lock sleeve engages at least one ridge; and a release nut, wherein the release nut comprises a crenellated first end, and wherein the first end of the release nut is engaged with the second end of the torsion lock sleeve; moving the torsion lock sleeve, wherein the step of moving the torsion lock sleeve comprises disengaging the first end of the release nut with the second end of the torsion lock sleeve; and moving the release nut.

Any discussion of a particular component of the device (e.g., a ridge 40) is meant to include the singular form of the component and also the plural form of the component, without the need to continually refer to the component in both the singular and plural form throughout. For example, if a discussion involves "the ridge 40," it is to be understood that the discussion pertains to one ridge (singular) and two or more ridges (plural). It is also to be understood that any discussion of a particular component or particular embodiment regarding a component is meant to apply to the apparatus embodiments and the method embodiments, without the need to re-state all of the particulars for both the apparatus and method embodiments.

Turning to the Figures, the device comprises a piston assembly 100. The piston assembly 100 can include a piston 101, a piston housing 103, and a piston adjustment sleeve 104. The piston assembly 100 can also include at least one shear pin 102, or more than one shear pin 102. As can be seen in the Figures, the piston 101 can be located adjacent to an inner release mandrel 10. At least a portion of the piston 101 can be attached to and/or located within the piston housing 103. The piston housing 103 can be operatively connected to the piston adjustment sleeve 104. The shear pin 102 can be located adjacent to the piston 101. In this manner, if a sufficient force is applied to the piston 101 then the shear pin 102 will shear, or break.

The device also includes a torsion lock sleeve 20. The torsion lock sleeve 20 is operatively connected to the piston assembly 100. The torsion lock sleeve 20 can be directly or operatively connected to the piston adjustment sleeve 104. By way of example, the torsion lock sleeve 20 can be operatively connected to the piston adjustment sleeve 104 via a torsion lock sleeve engagement ring 22. In this manner, the torsion lock sleeve 20 can be directly attached to the torsion lock sleeve engagement ring 22 and the torsion lock sleeve engagement ring 22 can then be directly connected to the piston adjustment sleeve 104. The torsion lock sleeve 20 comprises a crenellated second end. The second end is preferably located downstream of the first end of the torsion lock sleeve 20, and is also preferably located adjacent to a first end of a release nut 30. As used herein, the term "downstream" means in the direction away from the top of the device, wherein the top of the device is defined as being the area of the device that is closest to the wellhead. For example, the inner release mandrel may be located closer to the wellhead compared to the inner tool mandrel. As such, downstream would be in a direction away from the inner release mandrel towards the inner tool mandrel. Moreover, a portion of a particular component, such as the inner release mandrel, will be closer to the wellhead compared to another portion of the same component. In this example, downstream would be in a direction away from the portion closest to the wellhead towards the portion farther away from the wellhead. As used herein, the term "upstream" means in the direction towards the top of the device.

The device can further include a torsion lock sleeve gap 21. The torsion lock sleeve engagement ring 22 can be located within the torsion lock sleeve gap 21. The torsion lock sleeve gap 21 can be used to allow some movement of the piston assembly 100 without causing movement of the torsion lock sleeve 20. For example, the torsion lock sleeve gap 21 can be designed such that all of the force is channeled to cause movement of the piston 101, which causes the shear pin 102 to break, instead of some of the force also moving the torsion lock sleeve 20. The torsion lock sleeve gap 21 can be a variety of lengths. In an embodiment, the length of the torsion lock sleeve gap 21 is at least sufficient to allow the shear pin 102 to break without causing movement of the torsion lock sleeve 20. In this manner, as the piston 101, piston housing 103, and piston adjustment sleeve 104 are moved by force in an upstream direction, the shear pin 102 will break. During this movement, the piston adjustment sleeve 104 moves the torsion lock sleeve engagement ring 22 in the torsion lock sleeve gap 21. The torsion lock sleeve engagement ring 22 will continue to travel upstream in the torsion lock sleeve gap 21 without causing movement to the torsion lock sleeve 20 until the torsion lock sleeve engagement ring 22 has traveled the entire length of the torsion lock sleeve gap 21. Then, only after the shear pins 102 have sheared and the torsion lock sleeve engagement ring 22 has traveled the entire length of the torsion lock sleeve gap 21, will the torsion lock sleeve engagement ring 22 cause an upstream movement of the torsion lock sleeve 20.

As can be seen in FIGS. 1A-3B, the device can also include an inner release mandrel 10, an outer cylinder 50, and a lock nut 300. The lock nut 300 can be connected to the inner release mandrel 10 via right-hand threads and can be used to halt movement of the release nut 30. By way of example, and as can be seen in FIG. 1B, after movement of the release nut 30, the release nut can tighten up against the lock nut 300, which prevents additional movement of the release nut. The device can further include a shoulder for the lock nut 300 (not shown). The shoulder can be located downstream of the lock nut 300. The shoulder can be part of an intermediary mandrel (not shown).

Figure 1B:
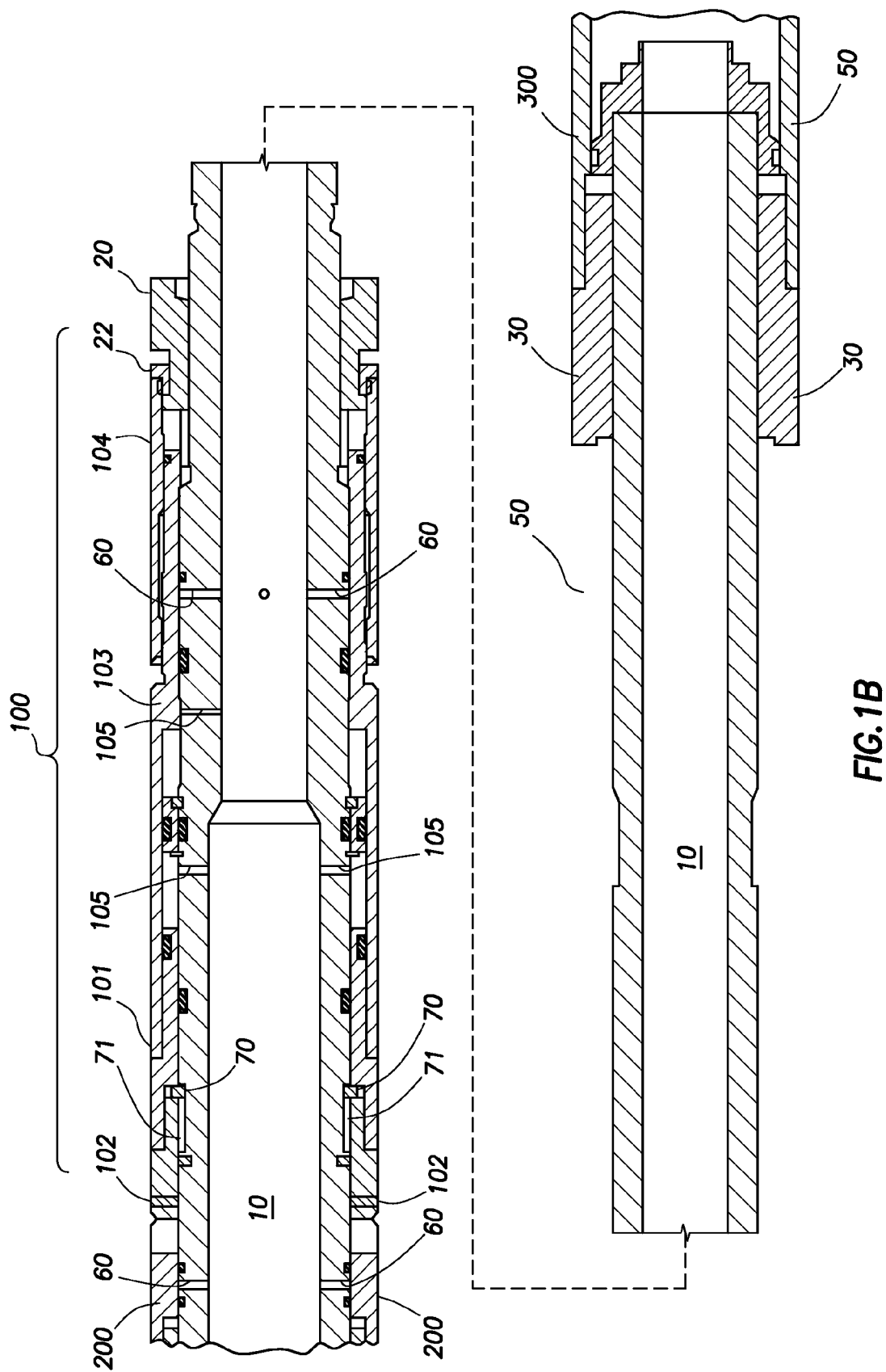
FIG. 1B is a diagram of the device from FIG. 1A, shown after movement of the release nut and outer cylinder.
Figure 2A:
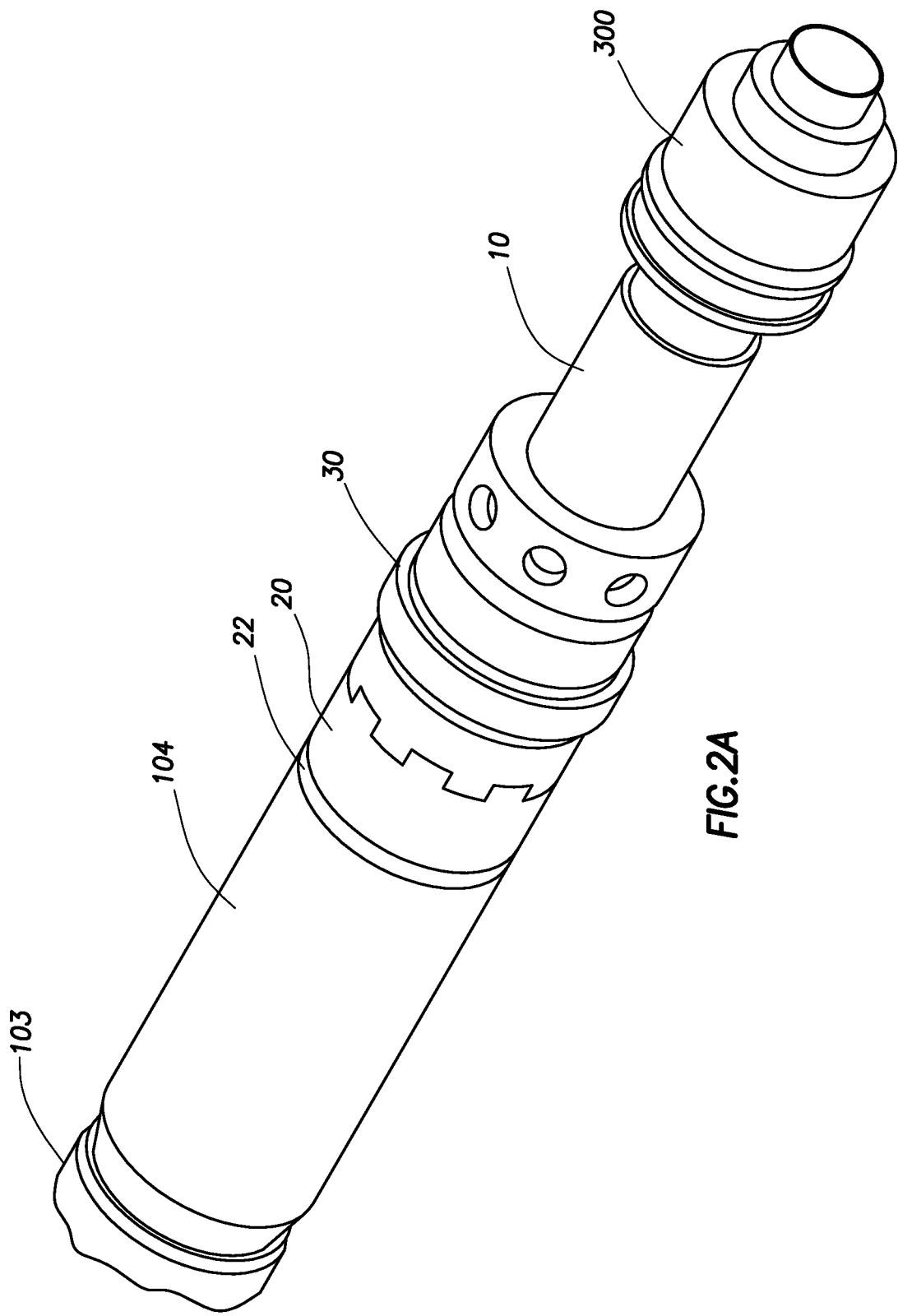
FIG. 2A is a three-dimensional perspective of the release nut and a torsion lock sleeve engaged with each other.
Figure 2B:
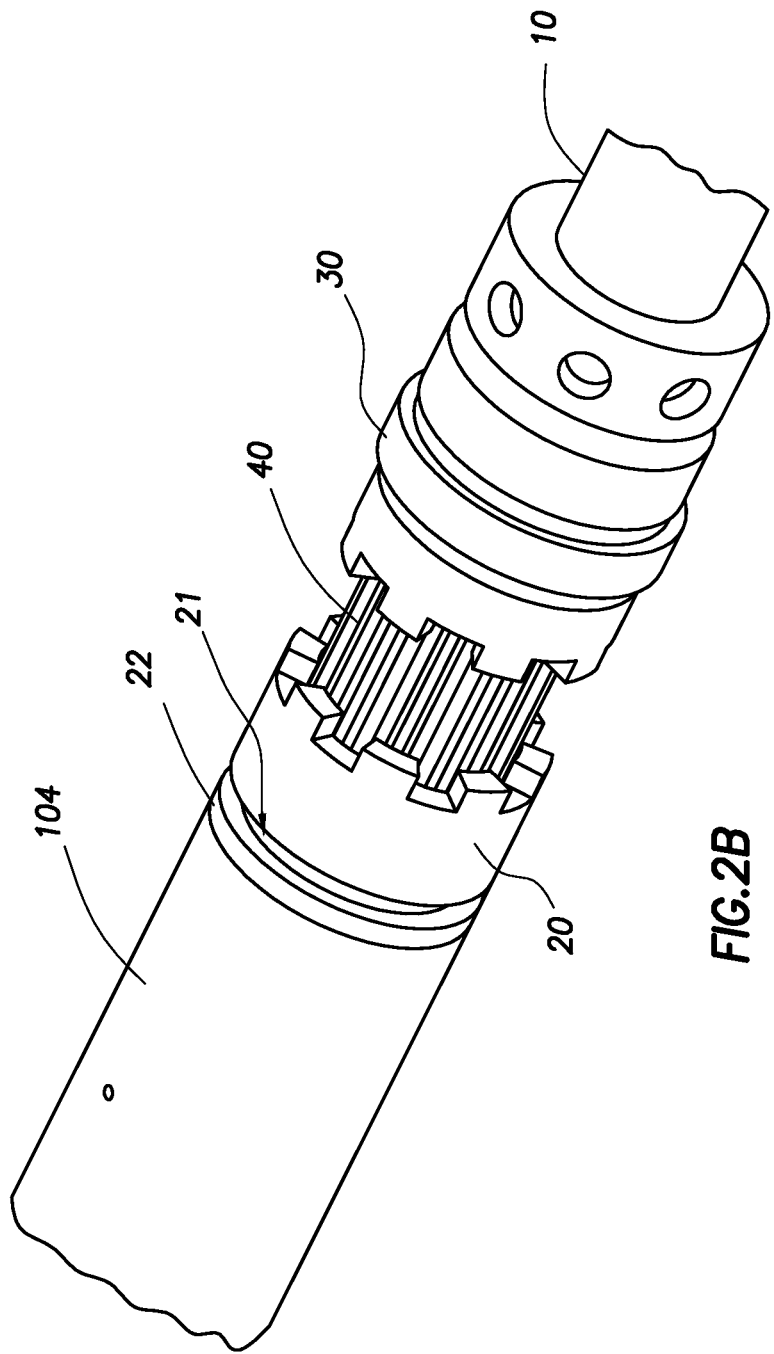
FIG. 2B is a three-dimensional perspective of the release nut and the torsion lock sleeve disengaged from each other.
Figure 3A:
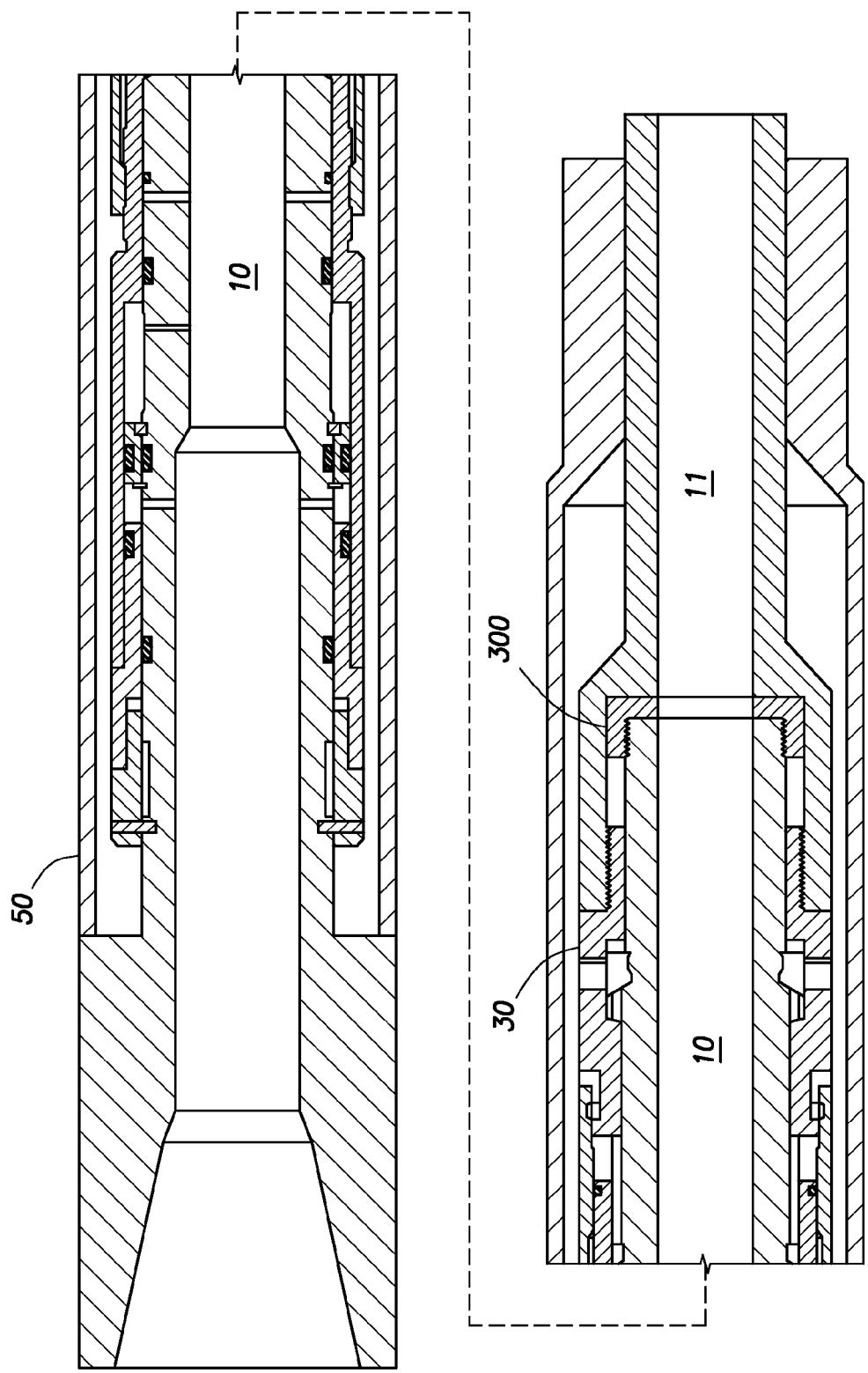
FIG. 3A depicts another embodiment of the device, wherein the release nut is attached to an inner tool mandrel, shown prior to movement of the release nut and the inner tool mandrel.
Figure 3B:
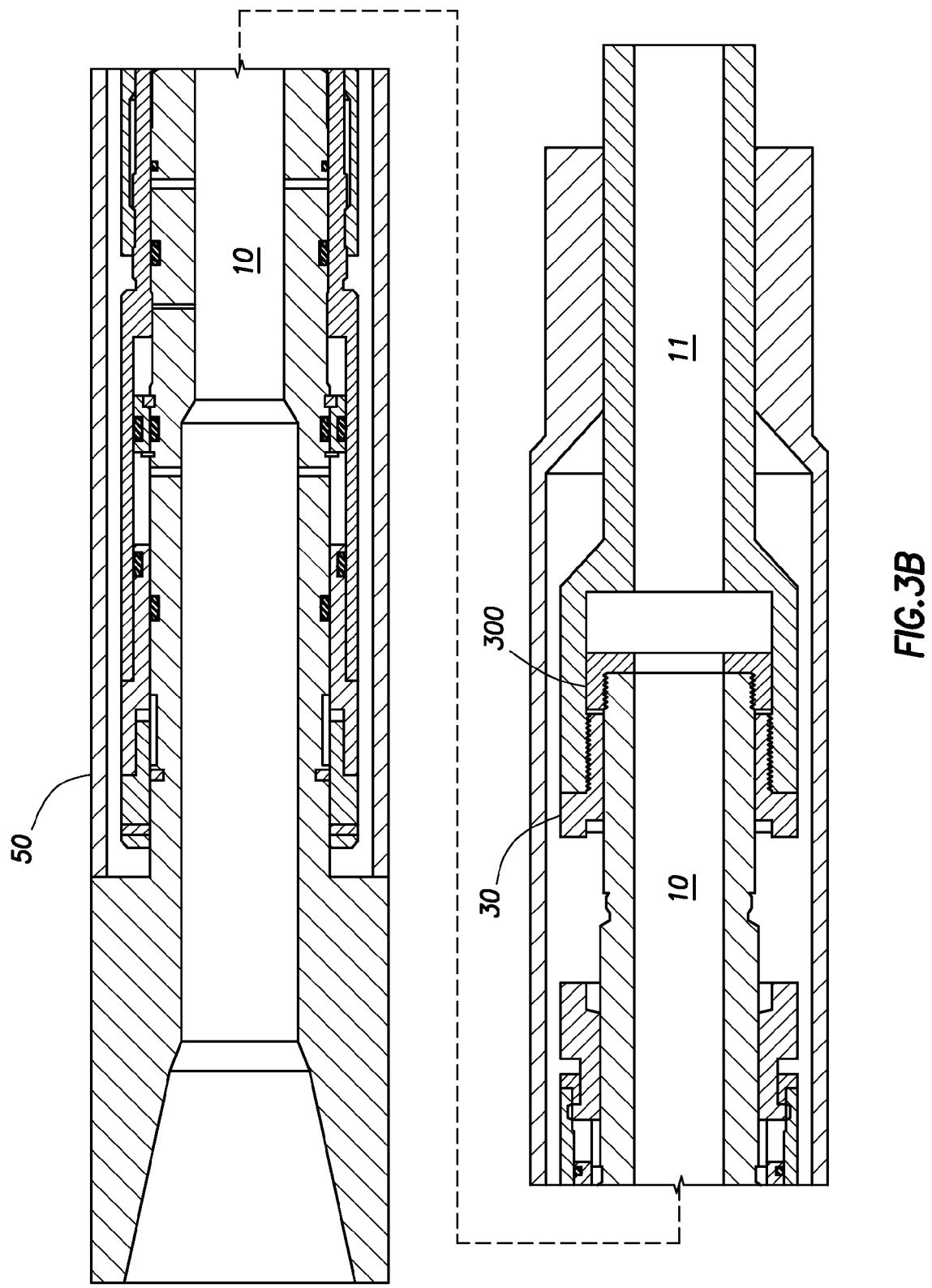
FIG. 3B is a diagram of the device from FIG. 3A, shown after movement of the release nut and the inner tool mandrel.

FIGS. 1A and 1B depict the device according to an embodiment and FIGS. 3A and 3B depict the device according to another embodiment. According to the embodiment depicted in FIGS. 1A and 1B, the device can include a collet prop connected to an inner tool mandrel (not shown in FIGS. 1A-2B). The release nut 30 can be connected to the outer cylinder 50 and can also be connected to the inner release mandrel 10 via left-hand threads. The inner release mandrel 10 can be shouldered against the lock nut 300. As can be seen in FIGS. 1A and 1B, as the release nut 30 is moved, the outer cylinder 50 moves with the release nut and the inner release mandrel 10 remains stationary. The release nut 30 and the outer cylinder 50 can travel downstream until stopped by the lock nut 300. The collet prop (not shown) can be connected to an inner tool mandrel (also not shown). According to this embodiment, the inner tool mandrel is operatively connected to the outer cylinder 50, such that after movement of the release nut 30 (and the outer cylinder 50), the collet prop can be dropped the desired distance.

Turning to the other embodiment depicted in FIGS. 3A and 3B, the inner release mandrel 10 can be connected to the lock nut 300. The outer cylinder 50 can be shouldered to the inner tool mandrel 11, and the inner tool mandrel 11 can be connected to the release nut 30. The release nut 30 can be connected to the inner release mandrel 10 via left-hand threads. The collet prop (not shown) can be connected to the inner tool mandrel 11. As can be seen, as the release nut 30 moves, the inner tool mandrel 11 also moves, while the outer cylinder 50 remains stationary. The release nut 30 and the inner tool mandrel 11 travel downstream until stopped by the lock nut 300. After movement of the release nut 30 (and the inner tool mandrel 11), the collet prop can be dropped the desired distance.

The torsion lock sleeve 20 is tubular is shape and at least a portion of the inner circumference of the torsion lock sleeve 20 engages at least one ridge 40. According to an embodiment, the device includes more than one, and preferably a plurality of, ridges 40. As can be seen in FIG. 2B, at least a portion of the inner release mandrel 10 includes the ridge 40. The ridge 40 can extend outwardly from the inner release mandrel 10. If the device includes more than one ridge 40, then the ridges 40 can be spatially arranged around the outer circumference of the inner release mandrel 10. According to an embodiment, the ridges 40 are equally spaced around the outer circumference of the inner release mandrel 10. The torsion lock sleeve 20 can include one or more recesses (not shown). The recesses can be the same depth as the height of the ridge 40, and the width of the recesses can be the same width, or preferably slightly larger than, the width of the ridge 40. In this manner, the ridge 40 can fit inside the recess. Preferably, the recesses of the torsion lock sleeve 20 are spatially arranged in the same pattern around the inner circumference of the torsion lock sleeve 20 as the ridges 40 of the inner release mandrel 10. According to an embodiment, the torsion lock sleeve 20 is inhibited, and preferably prohibited, from rotating about an axis of the inner release mandrel 10. The recess and the ridge 40 can be used to inhibit or prohibit rotational movement of the torsion lock sleeve 20.

The device includes the release nut 30. As can be seen in FIGS. 2A and 2B, the release nut 30 includes a crenellated first end, wherein the first end of the release nut 30 is capable of engaging the crenellated second end of the torsion lock sleeve 20. FIG. 2A shows the first end of the release nut 30 engaged with the second end of the torsion lock sleeve 20. FIG. 2B shows the release nut 30 disengaged from the torsion lock sleeve 20. As used herein, the word "crenellated" and all grammatical variations thereof, means having repeated indentations. Examples of crenellated items include battlements on a tower of a castle and crenellated molding. Each indentation forms an indented portion and a raised portion on the end of the torsion lock sleeve 20 and release nut 30. The indentions (and therefore, the raised portions) can be a variety of shapes, including but not limited to, square, rectangle, and rounded. Preferably the shape of the indentions is the same for both crenellated ends of the torsion lock sleeve 20 and the release nut 30. There can be only two indentations or more than two indentations. Preferably, the number of indentations on the end of the torsion lock sleeve 20 and the end of the release nut 30 is at least sufficient to allow the torsion lock sleeve 20 to engage, and preferably lock, with the release nut 30. The spacing of the indentations is also preferably the same width such that the torsion lock sleeve 20 can engage with the release nut 30.

In order to engage, the shape and dimensions of the indentations can be selected such that the raised portions on the first end of the release nut 30 can slide into the recessed portions of the second end of the torsion lock sleeve 20. In an embodiment, and as shown in FIG. 2A, the crenellated ends of the release nut 30 and the torsion lock sleeve 20 fit tightly together. Preferably, the crenellated ends of the release nut 30 and the torsion lock sleeve 20 fit together in a manner such that the release nut 30 and torsion lock sleeve 20 are engaged with each other. As used herein, reference to the release nut 30 and the torsion lock sleeve 20 being "engaged," and all grammatical variations thereof, means that if either component (i.e., the release nut 30 or the torsion lock sleeve 20) is incapable of, or prevented from, moving in a rotational direction about an axis, then the other component would also be incapable of rotational movement. By way of example, if the torsion lock sleeve 20 is prevented from rotational movement about an axis of the inner release mandrel 10 via the ridge 40, and the release nut 30 and the torsion lock sleeve 20 are engaged, then the release nut 30 is prevented from rotational movement because the torsion lock sleeve 20 is prevented from rotational movement. However, if the release nut 30 is disengaged from the torsion lock sleeve 20 (as shown in FIG. 2B), then rotational movement of either component is not dictated by the other component. For example, once disengaged, even if the torsion lock sleeve 20 is prevented from rotating due to the ridge 40, the release nut 30 may be capable of rotation. Of course, in this example, the release nut 30 may be prevented from rotation due to another reason, but it will not be due to engagement with the torsion lock sleeve 20.

The device can include at least one piston pressure port 105. According to an embodiment, the piston 101 is capable of being moved. The piston 101 can be moved in an upstream direction. According to an embodiment, when the piston 101 moves, the piston housing 103 and the piston adjustment sleeve 104 move as well. The piston pressure port 105 can be included when the piston 101 is to be moved by pressure. If the device includes the piston pressure port 105, then the piston pressure port 105 can be positioned in a variety of locations, for example, at a location such that the piston 101 is capable of being moved via pressure from the piston pressure port 105.

The device can also include a bypass sleeve 200. If the device does not include a bypass sleeve 200, then preferably a pressure is maintained on the piston assembly 100 such that the torsion lock sleeve 20 is held up from the release nut 30 in a disengaged position. Preferably, the pressure is maintained for at least a sufficient time to allow the complete movement of the release nut 30, for example, via applying a right-hand torque to the release nut 30. The bypass sleeve 200 can be located upstream of the piston 101, and in the direction of movement of the piston 101. The bypass sleeve 200 can be used to help stop upstream movement of the piston 101 and can be used to remove pressure from the system after movement of the piston 101. As can be seen in FIGS. 1A and 1B, the piston 101 can be moved (e.g., by pressure) such that the piston 101 travels along the inner release mandrel 10 in a direction toward the bypass sleeve 200. The piston 101 can shear the shear pin 102 during movement. If the piston 101 has traveled a sufficient distance, then the piston 101 can come in contact with the bypass sleeve 200. If pressure is maintained in the system, then the piston 101 can cause the bypass sleeve 200 to move in an upstream direction. There can be a shear pin (not shown) positioned adjacent the bypass sleeve 200, such that as the bypass sleeve 200 moves in an upstream direction, the bypass sleeve shear pin can break. After movement of the bypass sleeve 200, the pressure bypass port 60 can be opened. Now, the pressure in the system can exit into the wellbore via the opened pressure bypass port 60.

Once the pressure exits the system, the piston assembly 100 and the torsion lock sleeve 20 will tend to move in a downstream direction under the force of gravity and due to a lack of pressure holding the components up. The device can further include a retaining ring 70 and a retaining ring groove 71. The retaining ring 70 and the retaining ring groove 71 can be used to inhibit or prevent movement of the piston 101 in a downstream direction. The retaining ring 70 is preferably connected to the piston 101. The retaining ring groove 71 is preferably located a desired distance in an upstream direction from the retaining ring 70. The desired distance of the retaining ring groove 71 can be a distance no greater than the distance that the piston 101 is capable of traveling. In this manner, as the piston 101 moves in an upstream direction, the retaining ring 70 moves along with the piston 101. The retaining ring groove 71 is located the desired distance from the retaining ring 70 such that when the retaining ring 70 has traveled the desired distance, the retaining ring 70 will engage with the retaining ring groove 71. The retaining ring 70 can be designed such that it fits around the inner release mandrel 10. The retaining ring 70 can have a tension prior to engagement with the retaining ring groove 71. For example, the retaining ring 70 can be a C-clamp. In this manner, when the retaining ring 70 engages the retaining ring groove 71, then the retaining ring 70 can snap into a position within the retaining ring groove 71. The retaining ring 70 can now help prevent the piston 101 from moving and can also help prevent the torsion lock sleeve 20 from moving in a downstream direction and re-engaging with the release nut 30. The bypass sleeve 200 can also include a retaining ring and retaining ring groove (not shown) to help prevent the bypass sleeve from moving back in a downstream direction and also help maintain the bypass pressure port 60 in an open position.

The methods include the step of positioning the device in a portion of a subterranean formation. The subterranean formation can be penetrated by a well. According to an embodiment, the step of positioning includes positioning the device in a portion of the well. The step of positioning can be inserting the device into the well.

The methods include the step of moving the torsion lock sleeve 20, wherein the step of moving the torsion lock sleeve 20 comprises disengaging the first end of the release nut 30 with the second end of the torsion lock sleeve 20. The methods can further include the step of moving the piston 101. The step of moving the piston 101 can be performed before, or simultaneously with, the step of moving the torsion lock sleeve 20. According to an embodiment, the step of moving the piston 101 causes movement of the torsion lock sleeve 20. According to an embodiment, the torsion lock sleeve 20 is moved via movement of the torsion lock sleeve engagement ring 22. As the torsion lock sleeve engagement ring 22, and optionally the piston adjustment sleeve 104, travel in a direction away from the torsion lock sleeve 20, the torsion lock sleeve engagement ring 22 can travel the entire distance of the torsion lock sleeve gap 21. The torsion lock sleeve engagement ring 22 can then cause movement of the torsion lock sleeve 20. According to this embodiment, movement of the piston 101 causes movement of the torsion lock sleeve engagement ring 22, which in turn causes movement of the torsion lock sleeve 20. There can be a delay between movement of the piston 101 and movement of the torsion lock sleeve engagement ring 22, and there can also be a delay between movement of the torsion lock sleeve engagement ring 22 and movement of the torsion lock sleeve 20. The piston 101 can be moved by a variety of means, including but not limited to, hydraulic or mechanical force. Examples of mechanisms used to apply hydraulic force to the piston 101 include, but are not limited to, the use of: a ball or other sealing object on a sealing surface, an ambient chamber, a rupture disk, a flapper, a valve, or an explosive charge. Mechanical means to apply force to the piston can include, but are not limited to, the use of rotation, pushing, or pulling directly or indirectly on the piston 101 to cause movement of the piston. According to an embodiment, the torsion lock sleeve 20 is inhibited, or prevented, from rotational movement about an axis of the inner release mandrel 10, via, for example, the ridge 40.

According to an embodiment, the torsion lock sleeve 20 is moved at least a sufficient distance such that the second end of the torsion lock sleeve 20 becomes disengaged from the first end of the release nut 30. As discussed above, the second end of the torsion lock sleeve 20 and the first end of the release nut 30 are crenellated. In order to disengage, the raised portions of the crenellated ends are preferably not in contact with one another.

The methods also include the step of moving the release nut 30. The step of moving the release nut 30 is preferably performed after the step of moving the torsion lock sleeve 20. The step of moving the release nut 30 comprises moving the release nut 30 in an axial direction relative to the inner release mandrel 10. According to an embodiment, the release nut 30 is axially-moved in a downstream direction via rotational movement of the release nut 30. As discussed above, the release nut 30 can be connected to the inner release mandrel 10 via left-hand threads. The step of moving the release nut 30 can comprise applying a right-hand torque to at least the inner release mandrel 10. For example, after the release nut 30 is disengaged from the torsion lock sleeve 20, then the release nut 30 can be axially moved by applying a right-hand torque to the inner release mandrel 10. Preferably, the release nut 30 is axially moved in a downstream direction at least a sufficient distance. The sufficient distance can be the distance required for a collet prop to be dropped. The amount of downstream movement can be controlled with the use of the lock nut 300. The lock nut 300 can be positioned on the inner release mandrel 10 at a location downstream of release nut 30. Upon contact with the lock nut 300, the release nut 30 can be prevented from further downstream movement.

As can be seen in FIGS. 1A and 1B, the step of moving the release nut 30 can also include moving the outer cylinder 50. As can be seen in FIGS. 3A and 3B, the step of moving the release nut 30 can also include moving the inner tool mandrel 11.

The methods can further include the step of removing a tool from a wellbore (not shown) after the step of moving the release nut 30. The tool can be a variety of tools. According to an embodiment, the tool includes at least one collet and at least one collet prop. Examples of the tool include, without limitation, a drop-off tool, an expansion tool, a retrieval tool, and a conventional setting tool.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:
1. A device comprising:
   a torsion lock sleeve,
     wherein the torsion lock sleeve comprises a crenellated second end,
     wherein the torsion lock sleeve is tubular in shape, and
     wherein at least a portion of the inner circumference of the torsion lock sleeve engages at least one ridge, wherein the engagement is a non-threaded connection, wherein the ridge inhibits or prohibits rotational movement of the torsion lock sleeve, and wherein the ridge extends in a direction that is parallel with a longitudinal axis of the torsion lock sleeve; and a release nut, wherein the release nut comprises a crenellated first end, and wherein the first end of the release nut is capable of engaging the second end of the torsion lock sleeve.

2. The device according to claim 1, wherein the device further comprises a piston assembly.

3. The device according to claim 2, wherein the piston assembly includes a piston, a piston housing, and a piston adjustment sleeve.

4. The device according to claim 3, wherein the torsion lock sleeve is directly or operatively connected to the piston adjustment sleeve.

5. The device according to claim 3, wherein the piston is capable of being moved.

6. The device according to claim 5, wherein when the piston moves, the piston housing and the piston adjustment sleeve move as well.

7. The device according to claim 6, wherein movement of the piston is capable of causing movement of the torsion lock sleeve.

8. The device according to claim 6, wherein the torsion lock sleeve is capable of being moved at least a sufficient distance such that the second end of the torsion lock sleeve becomes disengaged from the first end of the release nut.

9. The device according to claim 1, wherein the device further comprises an inner release mandrel, an outer cylinder, a lock nut, and an inner tool mandrel.

10. The device according to claim 9, wherein the release nut is connected to the inner release mandrel via left-hand threads, and wherein the release nut is capable of being moved by applying a right-hand torque to at least the inner release mandrel.

11. The device according to claim 9, wherein the device further comprises a collet prop, wherein the collet prop is connected to the inner tool mandrel.

12. The device according to claim 11, wherein the lock nut is connected to the inner release mandrel.

13. The device according to claim 12, wherein the lock nut is used to halt movement of the release nut.

14. The device according to claim 13, wherein the release nut is connected to the outer cylinder and wherein the inner release mandrel is shouldered against the lock nut.

15. The device according to claim 14, wherein as the release nut is moved, the outer cylinder moves with the release nut and the inner release mandrel remains stationary.

16. The device according to claim 15, wherein the inner tool mandrel is operatively connected to the outer cylinder, such that after movement of the outer cylinder, the collet prop can be dropped a desired distance.

17. The device according to claim 13, wherein the outer cylinder is shouldered against the inner tool mandrel and wherein the inner tool mandrel is connected to the release nut via left-hand threads.

18. The device according to claim 17, wherein as the release nut moves, the inner tool mandrel moves with the release nut and the outer cylinder remains stationary.

19. The device according to claim 18, wherein after movement of the inner tool mandrel, the collet prop can be dropped a desired distance.

* * * * *